(12) United States Patent
Yamamori (10) Patent No.: US 10,431,835 B2
(45) Date of Patent: Oct. 1, 2019

(54) FUEL CELL SYSTEM AND START-UP METHOD THEREOF

(71) Applicant: TOYOTA JIDOSHA KABUSHIKI KAISHA, Toyota-shi, Aichi-ken (JP)

(72) Inventor: Keitaro Yamamori, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 395 days.

(21) Appl. No.: 14/939,795

(22) Filed: Nov. 12, 2015

(65) Prior Publication Data

US 2016/0141668 A1  May 19, 2016

(30) Foreign Application Priority Data

Nov. 14, 2014  (JP) ................. 2014-231455

(51) Int. Cl.
| | |
|---|---|
| *H01M 8/0432* | (2016.01) |
| *H01M 8/04223* | (2016.01) |
| *H01M 8/04828* | (2016.01) |
| *H01M 8/04492* | (2016.01) |
| *H01M 8/04302* | (2016.01) |

(52) U.S. Cl.
CPC ....... *H01M 8/0432* (2013.01); *H01M 8/0494* (2013.01); *H01M 8/04253* (2013.01); *H01M 8/04302* (2016.02); *H01M 8/04492* (2013.01); *H01M 2220/20* (2013.01)

(58) Field of Classification Search
CPC .......... H01M 8/0432; H01M 8/04302; H01M 8/04253; H01M 8/04492
See application file for complete search history.

(56) References Cited

U.S. PATENT DOCUMENTS

| | | | |
|---|---|---|---|
| 9,099,700 B2 * | 8/2015 | Miyata .............. | H01M 8/04253 |
| 2009/0208786 A1 * | 8/2009 | Manabe .............. | B60L 11/1885 |
| | | | 429/415 |
| 2010/0112389 A1 | 5/2010 | Miyata et al. | |
| 2013/0149628 A1 | 6/2013 | Ogawa et al. | |

FOREIGN PATENT DOCUMENTS

| | | |
|---|---|---|
| CN | 101473479 A | 7/2009 |
| JP | 2007-305346 | 11/2007 |
| JP | 2007305346 | * 11/2007 |
| JP | 2010-108834 | 5/2010 |
| JP | 2012-064539 A | 3/2012 |
| JP | 2012064539 | * 3/2012 |
| JP | 2013-218923 | 10/2013 |
| WO | WO2013-088463 A1 | 6/2013 |

* cited by examiner

*Primary Examiner* — Ula C Ruddock
*Assistant Examiner* — Thomas H. Parsons
(74) *Attorney, Agent, or Firm* — Finnegan, Henderson, Farabow, Garrett & Dunner, LLP (57) ABSTRACT

The present disclosure provides a fuel cell system which comprises: a target output reaching time estimation unit configured to estimate a target output reaching time that requires for a fuel cell after start-up at a below-freezing temperature to become capable of providing an expected output desired or expected by a user of the fuel cell system or a predetermined output according to the expected output, based on the water content in the fuel cell and the temperature inside the fuel cell at the time of start-up at a below-freezing temperature; and a target output reaching time notification unit that notifies the user of the time estimated by the target output reaching time estimation unit.

9 Claims, 7 Drawing Sheets

| A: OUTPUT IMMEDIATELY AFTER START-UP<br>B: MINIMUM OUTPUT<br>Tc: TIME THAT ELAPSES BEFORE REACHING OUTPUT C (KW) | | | START-UP TEMPERATURE °C | | | | | | | |
|---|---|---|---|---|---|---|---|---|---|---|
| | | | −20 | −15 | −14 | −13 | −12 | −11 | −10 | |
| INITIAL WATER CONTENT g | $W_1$ | A(KW) | A($W_1$,−20) | A($W_1$,−15) | A($W_1$,−14) | A($W_1$,−13) | A($W_1$,−12) | A($W_1$,−11) | A($W_1$,−10) | |
| | | B(KW) | B($W_1$,−20) | B($W_1$,−15) | B($W_1$,−14) | B($W_1$,−13) | B($W_1$,−12) | B($W_1$,−11) | B($W_1$,−10) | |
| | | Tc(sec) | Tc($W_1$,−20) | Tc($W_1$,−15) | — | — | — | — | — | |
| | $W_2$ | A(KW) | A($W_2$,−20) | A($W_2$,−15) | A($W_2$,−14) | A($W_2$,−13) | A($W_2$,−12) | A($W_2$,−11) | A($W_2$,−10) | |
| | | B(KW) | B($W_2$,−20) | B($W_2$,−15) | B($W_2$,−14) | B($W_2$,−13) | B($W_2$,−12) | B($W_2$,−11) | B($W_2$,−10) | |
| | | Tc(sec) | Tc($W_2$,−20) | Tc($W_2$,−15) | — | — | — | — | — | |
| | $W_3$ | A(KW) | A($W_3$,−20) | A($W_3$,−15) | A($W_3$,−14) | A($W_3$,−13) | A($W_3$,−12) | A($W_3$,−11) | A($W_3$,−10) | |
| | | B(KW) | B($W_3$,−20) | B($W_3$,−15) | B($W_3$,−14) | B($W_3$,−13) | B($W_3$,−12) | B($W_3$,−11) | B($W_3$,−10) | |
| | | Tc(sec) | Tc($W_3$,−20) | Tc($W_3$,−15) | Tc($W_3$,−14) | — | — | — | — | |
| | $W_4$ | A(KW) | A($W_4$,−20) | A($W_4$,−15) | A($W_4$,−14) | A($W_4$,−13) | A($W_4$,−12) | A($W_4$,−11) | A($W_4$,−10) | |
| | | B(KW) | B($W_4$,−20) | B($W_4$,−15) | B($W_4$,−14) | B($W_4$,−13) | B($W_4$,−12) | B($W_4$,−11) | B($W_4$,−10) | |
| | | Tc(sec) | Tc($W_4$,−20) | Tc($W_4$,−15) | Tc($W_4$,−14) | Tc($W_4$,−13) | — | — | — | |
| | $W_5$ | A(KW) | A($W_5$,−20) | A($W_5$,−15) | A($W_5$,−14) | A($W_5$,−13) | A($W_5$,−12) | A($W_5$,−11) | A($W_5$,−10) | |
| | | B(KW) | B($W_5$,−20) | B($W_5$,−15) | B($W_5$,−14) | B($W_5$,−13) | B($W_5$,−12) | B($W_5$,−11) | B($W_5$,−10) | |
| | | Tc(sec) | Tc($W_5$,−20) | Tc($W_5$,−15) | Tc($W_5$,−14) | Tc($W_5$,−13) | Tc($W_5$,−12) | — | — | |
| | $W_6$ | A(KW) | A($W_6$,−20) | A($W_6$,−15) | A($W_6$,−14) | A($W_6$,−13) | A($W_6$,−12) | A($W_6$,−11) | A($W_6$,−10) | |
| | | B(KW) | B($W_6$,−20) | B($W_6$,−15) | B($W_6$,−14) | B($W_6$,−13) | B($W_6$,−12) | B($W_6$,−11) | B($W_6$,−10) | |
| | | Tc(sec) | Tc($W_6$,−20) | Tc($W_6$,−15) | Tc($W_6$,−14) | Tc($W_6$,−13) | Tc($W_6$,−12) | Tc($W_6$,−11) | Tc($W_6$,−10) | |

▓ DIFFICULT TO REACH READY-ON STATE IMMEDIATELY AFTER START-UP

FUEL CELL SYSTEM AND START-UP METHOD THEREOF

BACKGROUND

Field

The disclosure relates to a fuel cell system and its start-up method. More specifically, the present disclosure relates to improvements in configurations of a fuel cell system that may start at a below-freezing temperature and in its start-up method.

Description of Related Art

In general, it takes a certain length of time for a fuel cell system to reach a state where a predetermined electric power can be supplied (i.e., a start-up completion state called a "Ready On" state). Normally, when the fuel cell is started, a warm-up operation for raising the temperature of the fuel cell to a temperature suitable for power generation is performed. This warm-up operation is often performed by self-heating of the fuel cell without using an external heater or the like that raises the temperature of the fuel cell, in consideration of the efficiency of the fuel cell system.

Conventionally, various techniques for rapidly starting fuel cells using self-heating as described above have been proposed. For example, in order to rapidly raise the temperature of a fuel cell during start-up in a low-temperature condition, the flow rate of a coolant to be circulated in the fuel cell is reduced or the circulation of the coolant is stopped. Alternatively, in contrast to such techniques, the flow rate of the circulating coolant may be increased in the middle of start-up operation of the fuel cell (see, for example, JP2013-218923 A).

However, since in many cases a fuel cell immediately after start-up at a below-freezing temperature has been left uncontrolled in a below-freezing condition until the start-up operation is started, water that remains in a part of a MEGA (Membrane Electrode and Gas Diffusion Layer Assembly) is frozen and even if the various techniques for rapidly starting the fuel cell are employed, it still takes a remarkable length of time to start the fuel cell. Under such circumstances, the larger the amount of frozen water is, the longer it takes to unfreeze it. In addition, the lower the temperature of the fuel cell at the time of start-up is, the longer it takes to raise the temperature. Thus, a user may get frustrated or feel uncomfortable since he/she has to wait before the fuel cell reaches the Ready-on state where a predetermined output (a Ready-on output) can be provided, after start-up at a below-freezing temperature.

Furthermore, because of the fact that, if a power-generating area has been reduced due to freezing, the power generation performance tends to be degraded, even if a fuel cell hybrid vehicle is turned into a WOT (Wide-Open Throttle: a state in which a throttle (throttle valve) is fully opened) state after the Ready-on state is reached, an output and increase in the output may be less than those during a start-up operation at ordinary temperatures. Thus, even if an accelerator pedal is pressed, a desired output desired or expected by a user may not be obtained and this may make the user feel strange. In such situation, if information regarding such phenomenon has been previously provided to the user, the user may not mind very much even if there is a deviation between the desired output (the output the user desires or expects when he/she presses the accelerator pedal) and the actual output. However, in fact, the user cannot help but feel strange as there is a significant deviation therebetween.

SUMMARY

Under such circumstances, an object of the present disclosure is to provide a fuel cell system and its start-up method capable of reducing or eliminating frustration or uncomfortableness that a user often feels while he/she is waiting for the Ready-on state during start-up at a below-freezing temperature, as well as reducing or eliminating strangeness that the user feels when he/she cannot obtain a desired output even by pressing an accelerator pedal after the Ready-on state is reached.

In order to achieve the object above, there is provided a fuel cell system comprising: a fuel cell that generates electric power through an electrochemical reaction between a fuel gas and an oxidant gas; a water content acquisition unit configured to acquire a water content in the fuel cell; a temperature acquisition unit configured to acquire a temperature inside the fuel cell; an estimation unit configured to estimate an amount of ice existing inside the fuel cell based on the acquired water content and temperature; and a notification unit that notifies a user of a time required for the estimated amount of ice to be reduced to a predetermined value or less.

In consideration of the above circumstances, the present disclosure has been achieved by focusing on the finding that the amount of frozen water at the time of start-up at a below-freezing temperature and the time required for raising temperature can be estimated based on the temperature of and the water content in the fuel cell stack and focusing on the amount of ice remaining within the fuel cell as means for estimating the time taken before a predetermined output of the fuel cell can be obtained. Based on these factors (the temperature and water content), the time required for the amount of ice in the fuel cell after the start-up at a below-freezing temperature to be reduced to the predetermined value or less is estimated and notified to the user.

The fuel cell system may further comprise: a target output reaching time estimation unit configured to estimate a target output reaching time that requires for the fuel cell after start-up at a below-freezing temperature to become capable of providing an expected output desired or expected by a user of the fuel cell system or a predetermined output according to the expected output, based on a water content in the fuel cell and a temperature inside the fuel cell at the time of start-up at a below-freezing temperature; and a target output reaching time notification unit that notifies the user of the time estimated by the target output reaching time estimation unit.

In consideration of the above circumstances, the present disclosure has been achieved based on the finding that the amount of frozen water at the time of start-up at a below-freezing temperature and the time required for raising temperature can be estimated based on the temperature of and the water content in the fuel cell stack, in particular, based on the finding that could be obtained by focusing the water content (or the amount of ice) remaining in the fuel cell, as estimation means for the time required for a predetermined output of the fuel cell to be secured. Based on these factors (the temperature and water content), the target output reaching time required for the fuel cell after start-up at a below-freezing temperature to become capable of providing an output desired by a user is estimated and notified to the user. Such configuration can allow the user to understand the situation in which there is a deviation between the desired output and the actual output until the target output reaching time elapses. Accordingly, it is possible to reduce or eliminate the strangeness that the user would feel when a predetermined output cannot be obtained even by pressing an accelerator pedal. In addition, in a situation before the fuel cell reaches the Ready-on state, since the target output reaching time required for the fuel cell to reach the Ready-on state is estimated and notified to the user, it is possible to reduce or eliminate the uncomfortableness that the user would feel when he/she has no idea about how long he/she has to wait for the Ready-on state.

A preferred example of the target output reaching time may be a time required for the fuel cell to reach a Ready-on state where the fuel cell provides a Ready-on output for supplying a predetermined electric power, after an ignition is turned on.

A preferred example of the target output reaching time may be a time taken from when the Ready-on state where the fuel cell provides a Ready-on output for supplying a predetermined electric power is reached to when the fuel cell provides an output according to the position of an accelerator pedal as pressed by the user. In this case, the position of the accelerator pedal as pressed by the user may be, for example, a fully-pressed position.

The fuel cell system may comprise a map that associates water content within the fuel cell and a temperature of the fuel cell at the time of start-up at a below-freezing temperature with the target output reaching time, wherein the target output reaching time is estimated using the map.

A method according to another aspect of the present disclosure is a start-up method of starting, at a below-freezing temperature, a fuel cell system including a fuel cell that generates electric power through an electrochemical reaction between a fuel gas and an oxidant gas, the method comprising: estimating a target output reaching time that requires for the fuel cell after start-up at a below-freezing temperature to become capable of providing an expected output desired or expected by a user of the fuel cell system or a predetermined output according to the expected output, based on a water content in the fuel cell and a temperature inside the fuel cell at the time of start-up at a below-freezing temperature; and notifying the user of the estimated time.

BRIEF DESCRIPTION OF THE DRAWINGS

FIG. 7 is a diagram showing an example of mapping indicating results of study regarding the output transition model, etc. during the start-up at a below-freezing temperature.

DETAILED DESCRIPTION OF PREFERRED EMBODIMENTS

A configuration of the present disclosure will be described in detail below based on one example embodiment shown in the drawings. Although the following description will describe, as an example, a situation in which the present disclosure is applied to a fuel cell system supposed to be installed in a fuel cell hybrid vehicle (FCHV), the scope of application is not limited thereto. Specifically, although the following description will describe an example of a system that is applicable as an in-vehicle power generation system for a fuel cell hybrid vehicle, a fuel cell system 1 is also applicable as a power generation system to be installed in various types of movable bodies (such as ships and airplanes) and in self-propelled objects such as robots and further applicable as a stationary power generation system.

Figure 1:
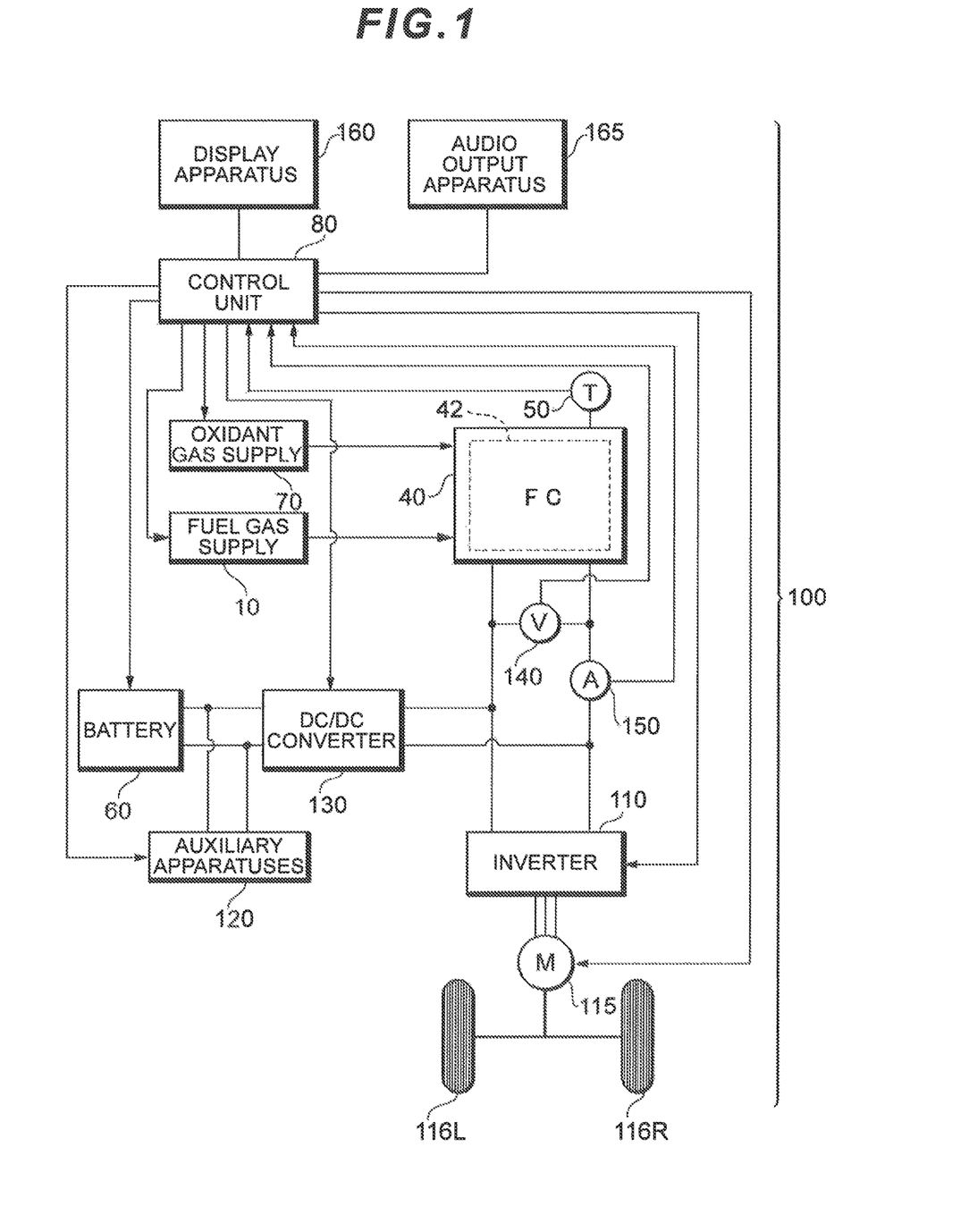
FIG. 1 is a diagram showing an example configuration of a primary part of a fuel cell system according to an embodiment of the present disclosure.

FIG. 1 is a diagram showing a configuration of a primary part of a fuel cell system 100 according to an embodiment. Although the present embodiment assumes a fuel cell system to be installed in vehicles such as a fuel cell hybrid vehicle (FCHV), an electric vehicle and a hybrid vehicle, it can also be applied to various types of movable bodies (such as ships, airplanes and robots) as well as stationary power supply, in addition to vehicles.

A fuel cell 40 is means for generating electric power from reactant gasses (a fuel gas and an oxidant gas) that are supplied thereto and various types of fuel cells such as a solid polymer electrolyte-type cell can be employed. The fuel cell 40 has a stack 42 in which a plurality of unit cells, each provided with a MEGA, etc., is stacked in series. An output voltage (hereinafter referred to as a FC voltage) and an output current (hereinafter referred to as an FC current) of the fuel cell 40 are detected by a voltage sensor 140 and a current sensor 150, respectively. A fuel gas such as a hydrogen gas is supplied from a fuel gas supply 10 to a fuel electrode (an anode) of the fuel cell 40 and an oxidant gas such as air is supplied from an oxidant gas supply 70 to an oxygen electrode (a cathode).

The fuel gas supply 10 includes, for example, a hydrogen tank, various valves, etc., and controls the amount of fuel gas to be supplied to the fuel cell 40 by regulating the degree of opening and ON/OFF time of the valves. The oxidant gas supply 70 includes, for example, an air compressor, a motor for driving the air compressor, an inverter, etc. and controls the amount of oxidant gas to be supplied to the fuel cell 40 by regulating the number of revolutions of the motor, etc.

The battery 60 is a chargeable and dischargeable secondary battery and is constituted by, for example, a nickel hydrogen battery. Obviously, a chargeable and dischargeable capacitor other than the secondary battery may alternatively be employed in place of the battery 60. This battery 60 is connected in parallel to the fuel cell 40 via a DC/DC converter 130.

The inverter 110 may be, for example, a PWM inverter of a pulse width modulation type and the inverter 110 converts direct-current power output from the fuel cell 40 or the battery 60 to three-phase alternating current power in accordance with a control command provided by a control unit 80 and supplies the resulting power to a traction motor 115. The traction motor 115 is a motor for driving wheels 116L and 116R (i.e., a power source of a movable body) and the number of revolutions of the motor is controlled by the inverter 110. The traction motor 115 and the inverter 110 are connected to the fuel cell 40.

The DC/DC converter 130 is a full-bridge converter that includes, for example, four power transistors (not shown)

and a dedicated drive circuit (not shown). The DC/DC converter 130 has: a function of increasing or decreasing a DC voltage input from the battery 60 and outputting the resulting voltage to the fuel cell 40; and a function of increasing or decreasing the DC voltage input from the fuel cell 40, etc. and outputting the resulting voltage to the battery 60. Due to the functions of the DC/DC converter 130, the battery 60 can be charged or discharged.

Auxiliary apparatuses 120 such as vehicle auxiliary apparatuses and FC auxiliary apparatuses are connected between the battery 60 and the DC/DC converter 130. The battery 60 serves as a power supply for these auxiliary apparatuses 120. It should be noted that the vehicle auxiliary apparatuses refer to various types of electric power equipment used during driving of the vehicle (such as lighting equipment, air-conditioning equipment and a hydraulic pump) and the FC auxiliary apparatuses refer to various types of electric power equipment used for operating the fuel cell 40 (such as pumps for supplying the fuel gas and the oxidant gas).

The control unit (control apparatus) 80 includes a CPU, a ROM, a RAM, etc., and centrally controls components in the fuel cell system based on sensor signals input from the voltage sensor 140, the current sensor 150, a temperature sensor 50 for detecting the temperature of the fuel cell 40, an SOC sensor for detecting the state of charge of the battery 60, an accelerator pedal sensor for detecting an accelerator pedal position, etc. In addition, the control unit 80 according to the present embodiment also performs scavenging processing which is performed when the fuel cell system is stopped (a control performed as a countermeasure against a low temperature condition).

A display apparatus 160 includes a liquid crystal display apparatus and various types of lamps. An audio output apparatus 165 includes a speaker, an amplifier, a filter, etc. The control unit 80 uses the display apparatus 160 and the audio output apparatus 165 to notify a user of various types of control content. Examples of the control content include the content of control regarding scavenging processing that is performed when the fuel cell system is stopped (e.g., display of a message indicating termination of the scavenging processing and calculation of time required for the scavenging process to be terminated and the content of control regarding estimation of a target output reaching time to be described later).

Figure 2:
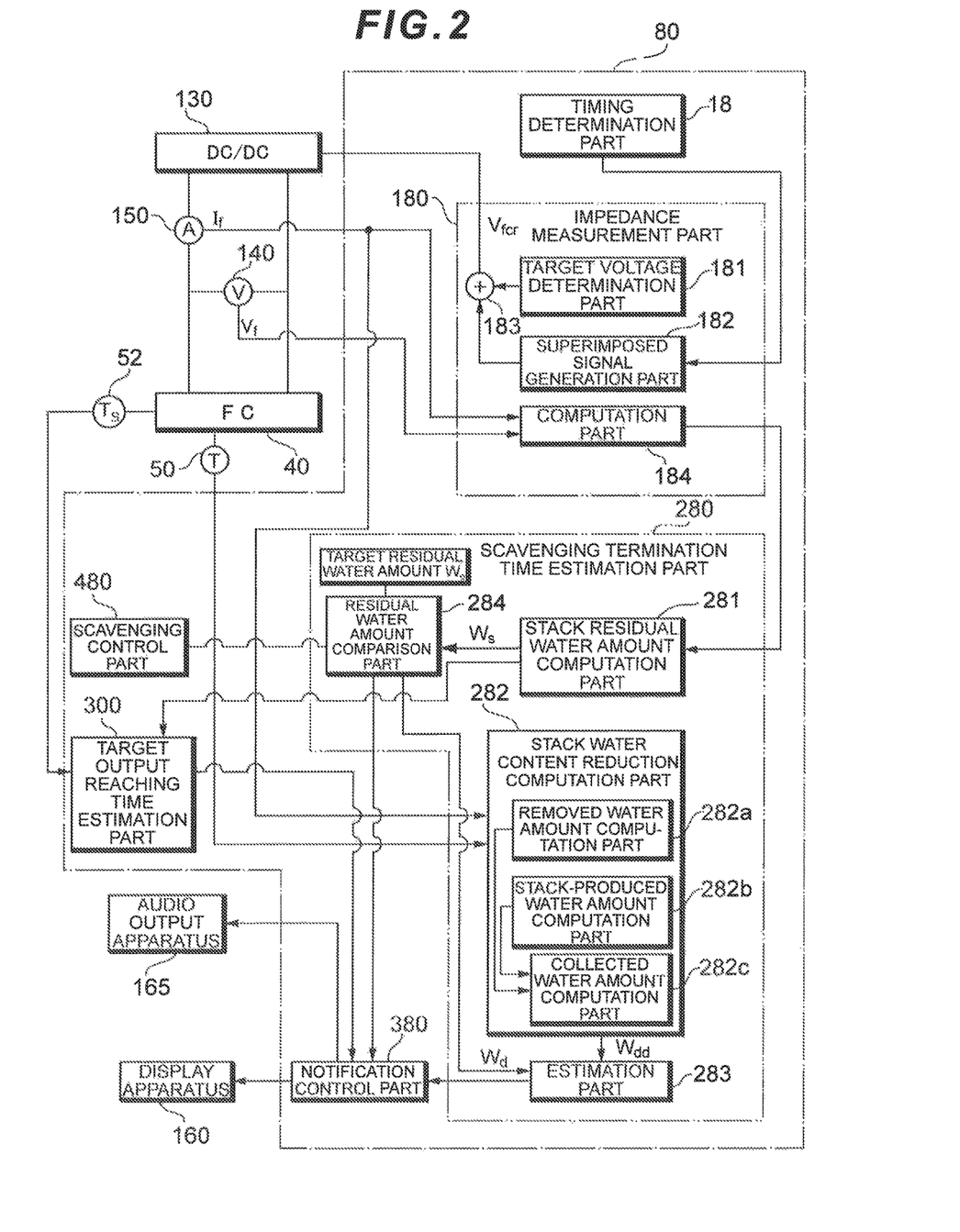
FIG. 2 is a block diagram for explaining notification processing, etc. in the fuel cell system.

FIG. 2 is a block diagram for explaining notification processing, etc. according to the present embodiment. The control unit 80 implements the functions of a timing determination part 18, an impedance measurement part 180, a scavenging termination time estimation part 280, a notification control part 380 and a scavenging control part 480.

<Timing Determination Part 18>

The timing determination part 18 determines a timing to start impedance measurement. When detecting an ignition key being turned on, the timing determination part 18 judges that the impedance measurement should be started and sends an instruction for starting the impedance measurement to a superimposed signal generation part 182. Although the sending of the instruction for starting the Impedance measurement is triggered by the detection of the ignition key being turned on in the present embodiment, the timing to send the instruction for starting the impedance measurement is arbitrarily determined.

<Impedance Measurement Part 180>

The impedance measurement part 180 includes a target voltage determination part 181, the superimposed signal generation part 182, a voltage instruction signal generation part 183 and a computation part 184.

The target voltage determination part 181 determines a target output voltage based on various sensor signals input from the accelerator pedal sensor, the SOC sensor, etc. and outputs the determined target output voltage to the voltage instruction signal generation part 183.

In response to the instruction for starting impedance measurement sent from the timing determination part 18, the superimposed signal generation part 182 generates an impedance measurement signal (e.g., a certain frequency sine curve with an amplitude value of 2V) to be superimposed on the output target voltage and outputs the generated signal to the voltage instruction signal generation part 183. The parameters (a type of waveform, a frequency and an amplitude value) for the impedance measurement signal may be set as appropriate in accordance with the design of the fuel cell system.

The voltage instruction signal generation part 183 superimposes the impedance measurement signal on the target output voltage and outputs the resulting signal as a voltage instruction signal Vfcr to the DC/DC converter 130. The DC/DC converter 130 controls the voltages of the fuel cell 40, etc. based on the supplied voltage instruction signal Vfcr.

The computation part 184 samples the voltage (FC voltage) Vf of the fuel cell 40 detected by the voltage sensor 140 and the current (FC current) If of the fuel cell 40 detected by the current sensor 150 at a predetermined sampling rate and performs Fourier transform processing or the like (FFT computation processing or DFT computation processing). The computation part 184 obtains the impedance of the fuel cell 40 by, for example, dividing a FC voltage signal after the Fourier transform processing by a FC current signal after the Fourier transform processing. The computation part 184 outputs the resulting impedance of the fuel cell 40 (hereinafter referred to as "stack impedance") to a stack residual water amount calculation part 281.

<Scavenging Termination Time Estimation Part 280>

The scavenging termination time estimation part 280 includes the stack residual water amount computation part 281, a stack water content reduction computation part 282, an estimation part 283, a residual water amount comparison part 284.

Figure 3:
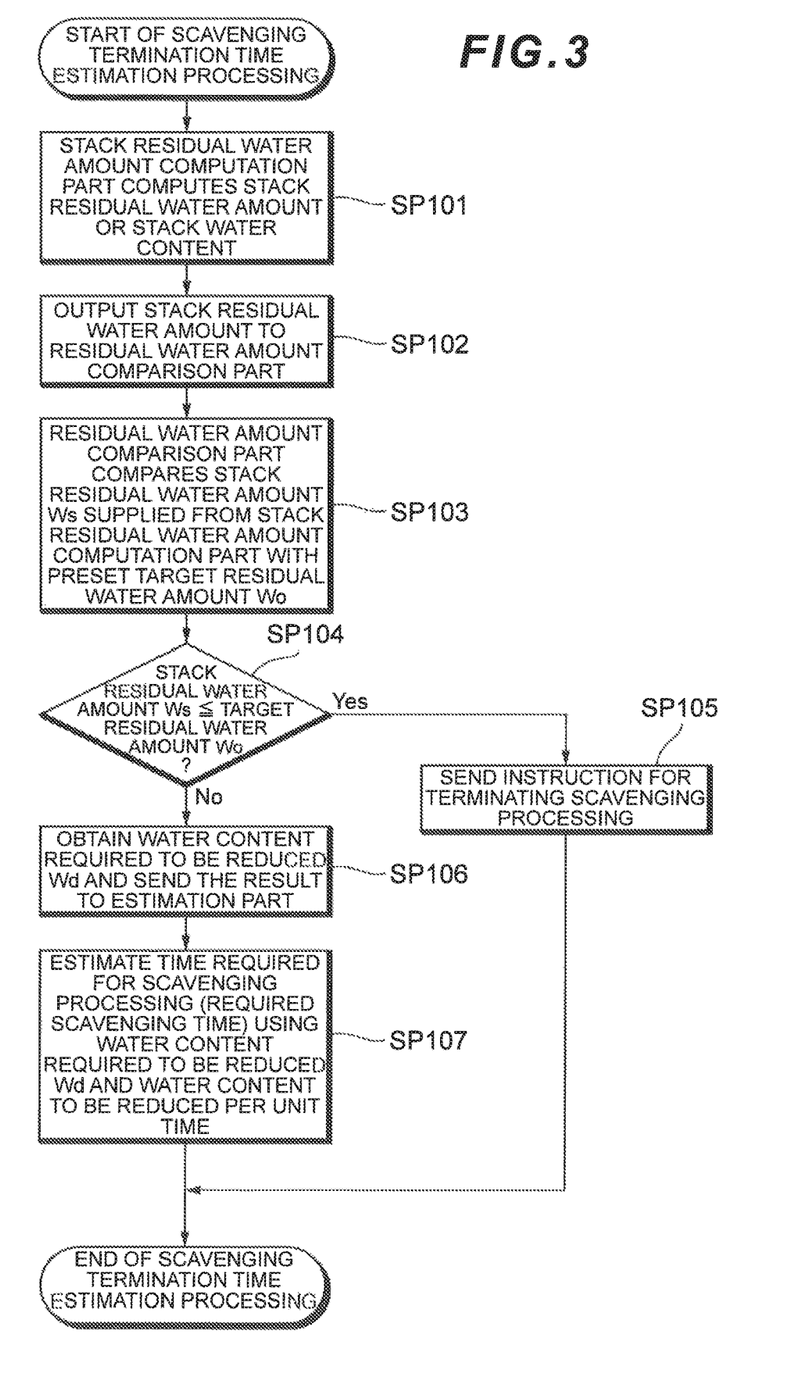
FIG. 3 is a flowchart showing an example of estimation processing for scavenging termination time.

FIG. 3 is a flowchart showing an example of estimation processing for estimating scavenging termination time. The stack residual water amount computation part 281 computes the residual water amount in the stack (the stack residual water amount or the water content of the stack) based on the stack impedance supplied by the computation part 184 (step SP101). The stack residual water amount computation part 281 stores in advance a function F representing the relationship between the stack impedance and the stack residual water amount. The stack residual water amount computation part 281 substitutes the stack impedance for the function F to obtain the stack residual water amount. The stack residual water amount computation part 281 outputs the obtained stack residual water amount to the residual water amount comparison part 284 (step SP102).

The residual water amount comparison part 284 compares the stack residual water amount Ws supplied from the stack residual water amount computation part 281 with a preset target residual water amount Wo and judges whether the scavenging processing is necessary or not (steps SP103 and SP104). If the stack residual water amount Ws is equal to or less than the target residual water amount Wo, the residual water amount comparison part 284 judges that the scavenging processing is not necessary and sends an instruction for terminating scavenging processing to the notification control part 380 (step SP105).

On the other hand, if the stack residual water amount Ws exceeds the target residual water amount Wo, the residual water amount comparison part 284 judges that the scavenging processing is necessary, obtains a water content that should be reduced (hereinafter referred to as the "water content required to be reduced") by subtracting the target residual water amount Wo from the stack residual water amount Ws, and sends the obtained value to the estimation part 283 (step SP106).

The stack water content reduction computation part 282 computes the water content to be reduced from the stack per unit time and includes a removed water amount computation part 282a, a stack-produced water amount computation part 282b and a collected water amount computation part 282c.

The estimation part 283 estimates time required for scavenging processing (hereinafter referred to as the "required scavenging time)" using the water content required to be reduced Wd that is supplied from the residual water amount comparison part 284 and the stack water content to be reduced per unit time that is supplied from the stack water content reduction computation part 282 (step SP107).

<Target Output Reaching Time Estimation Part 300>

The target output reaching time estimation part 300 estimates a target output reaching time that is required for the fuel cell 40 after start-up at a below-freezing temperature to become capable of providing an expected output desired or expected by the user of the fuel cell system 1 or providing a predetermined output according to the expected output, based on the water content in the fuel cell 40 and the temperature inside the fuel cell 40 as of the start-up at a below-freezing temperature. The water content in the fuel cell 40 and the temperature inside the fuel cell 40 are obtained from the results of detection by the stack residual water amount computation part 281 and a temperature sensor 52 that detects the temperature of a predetermined spot (e.g., water outlet of the fuel cell (FC) stack) in the fuel cell 40, respectively (see FIG. 2).

The above-mentioned expected output desired or expected by the user of the fuel cell system 1 refers to an output that the user would expect to obtain in a normal condition (not below freezing), or an output that the user desires to obtain in the Ready-on state (Ready-on output), and the predetermined output according to the expected output refers to an output of a level that can satisfy the degrees of expectation of many users (in other words, an output that does not cause many users to feel strange), although it is difficult to quantitatively indicate the expected output desired or expected by users as it should differ depending on the senses of users. The target output reaching time required for the fuel cell to be capable of providing such expected output desired or expected by the user of the fuel cell system 1 varies depending on the condition. For example, if the fuel cell 40 is in a condition in which the ignition has been turned on, the time required for the fuel cell to reach the Ready-on state where it can provide the Ready-on output corresponds to the target output reaching time. After the fuel cell 40 has reached the Ready-on state, for example, the time required for the fuel cell to become capable of providing an output according to the position of the accelerator pedal as pressed by the user (e.g., a WOT output) corresponds to the target output reaching time.

<Notification Control Part 380>

The notification control part 384 controls the content of outputs from the display apparatus 160 and the audio output apparatus 165 based on the notification from the residual water amount comparison part 284 and the required scavenging time output from the estimation part 283. Specifically, when the residual water amount comparison part 284 issues the instruction for terminating the scavenging processing, for example, a scavenging termination message is displayed on the display apparatus 160 and an audio message or an alarm sound indicating that the scavenging processing has been terminated is output from the audio output apparatus 165.

On the other hand, when the required scavenging time is output from the estimation part 283, for example, a message indicating the required scavenging time estimated by the estimation part 283 (time estimated to be taken for scavenging to be terminated) is displayed on the display apparatus 160 and an audio message indicating the estimated time is output from the audio output apparatus 165. An operation performed when the fuel cell system is terminated will be described below.

In addition, the notification control part 380 of the present embodiment controls the content of outputs from the display apparatus 160 and the audio output apparatus 165 based on the output from the target output reaching time estimation part 300. Specifically, when the target output reaching time is output from the target output reaching time estimation part 300, the notification control part 380 displays the target output reaching time on the display apparatus 160 and/or outputs an audio message indicating the target output reaching time from the audio output apparatus 165.

<Explanation of Estimation of Target Output Reaching Time>

Figure 4:
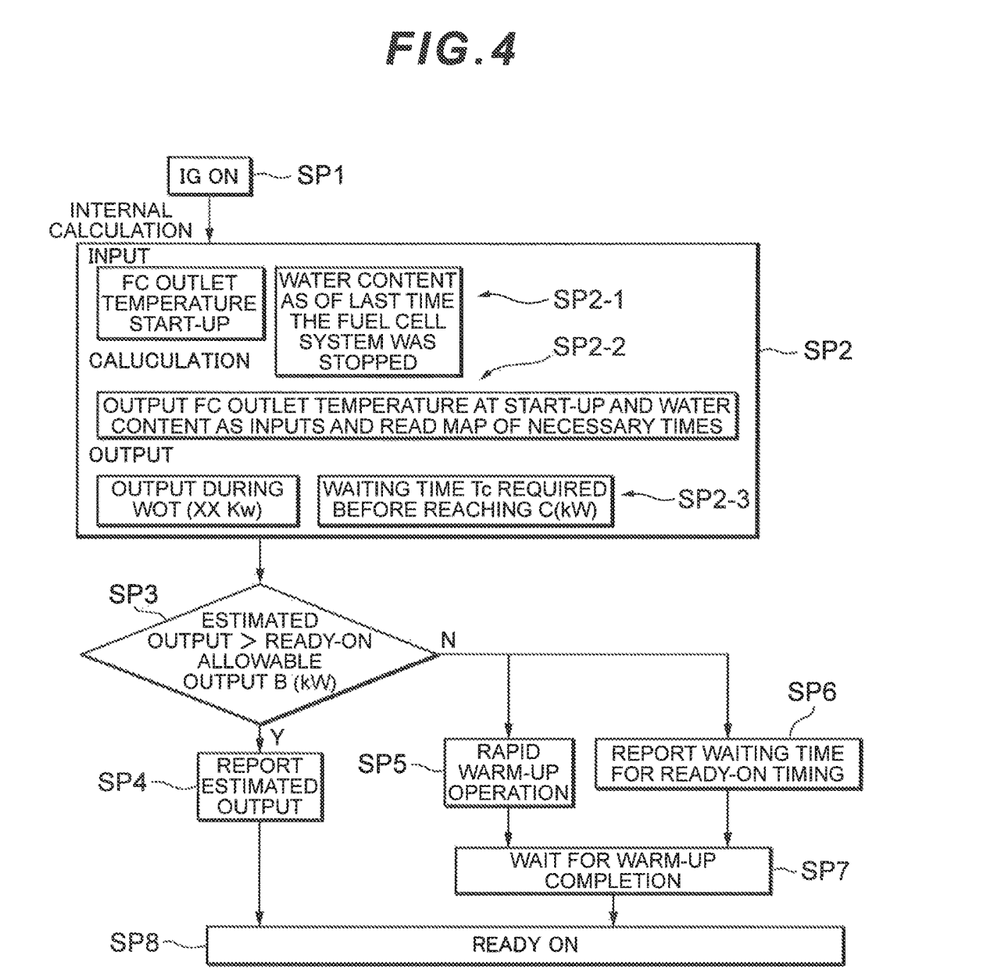
FIG. 4 is a flowchart showing an example of processing of: estimating a target output reaching time required for a fuel cell after start-up at a below-freezing temperature to become capable of providing a target output for providing an output desired or expected by a user of the fuel cell system or a predetermined output according to the expected output; and notifying the user of the estimation result.

FIG. 4 is a flowchart showing an example of processing of: estimating the target output reaching time required for the fuel cell 40 after start-up at a below-freezing temperature to become capable of providing the expected output desired or expected by the user or a predetermined output according to the expected output; and notifying the user of the estimation result.

When the ignition key is turned on (IG ON) (step SP1), the target output reaching time estimation part 300 reads an outlet temperature of the fuel cell 40 at the time of start-up at a below-freezing temperature (the temperature of the water outlet of the fuel cell stack at the time of start-up) and the water content in the fuel cell 40 as of the last time the fuel cell system was stopped (step SP2-1). The FC outlet temperature at the time of start-up can be obtained based on the detection result of the temperature sensor 52. The water content in the fuel cell 40 as of the last time the fuel cell system was stopped can be obtained based on computation results that the stack residual water amount computation part 281 has made until the last time the fuel cell system was stopped.

Next, the target output reaching time estimation part 300 reads a map of necessary times (required times), inputs the above-mentioned information (i.e. the FC outlet temperature at the time of start-up and the water content in the fuel cell as of the last time the fuel cell system was stopped), and obtains a result (target output reaching time) from a correlation table (step SP2-2). A specific example of the map and a specific example of a model for obtaining the target output reaching time will be described later (see FIGS. 5-7).

Then, the target output reaching time estimation part 300 outputs a predetermined fuel cell output obtained from the map (e.g., an estimated output XX kW during the WOT (which means an output obtained when the accelerator pedal is fully pressed and the "XX" denotes a predetermined value obtained from the map) and a target output reaching time Tc (e.g., a waiting time required for the fuel cell 40 to reach the maximum output C (kW)) (step SP2-3).

Next, the target output reaching time estimation part 300 compares the magnitude of the estimated output during the WOT and the magnitude of a Ready-on allowable output (step SP3). The Ready-on allowable output (hereinafter simply referred to as the "Ready-on output" in some context) refers to the minimum output required to bring the fuel cell into the Ready-on state. Although the Ready-on allowable output is indicated as "B (kW)" in this context (see FIG. 4), a specific value may be set as appropriate.

As a result of the comparison, if the estimated output during the WOT exceeds the Ready-on allowable output, the estimated output is reported (step SP4) to indicate that the fuel cell has reached a Ready-on timing as it is in the Ready-on state (step SP8).

On the other hand, if the estimated output during the WOT does not exceed the Ready-on allowable output, the control unit 80 instructs to start warm-up processing by a rapid warm-up operation (e.g., by causing the fuel cell 40 to generate heat by performing power generation in a highly-loaded state) (step SP5). In addition, the terminal output reaching time estimation part 300 outputs the time T required to bring the fuel cell into the Ready-on state (target output reaching time) and causes the display apparatus 160 to display the time T and/or the audio output apparatus 165 to output the time T as an audio message, to thereby notify a user (e.g., a driver) of the target output reaching time (step SP6). In this way, by notifying the user of the target output reaching time in advance, it is possible to reduce or eliminate the uncomfortableness that the user would feel when he/she has no idea of how long he/she has to wait until the fuel cell reaches the Ready-on state. In addition to or in place of such notification means, a body-sensory medium such as light, sound, vision, heat and vibration may be used.

After steps SP5 and SP6, the target output reaching time estimation part 300 waits for the completion of the warm-up processing and, after the completion of the warm-up processing, indicates that the fuel cell has reached the Ready-on timing as it is in the Ready-on state.

Then, based on the target output reaching time Tc (e.g., waiting time required for the fuel cell to reach the maximum output C (kW)) output in steps SP2-3, the target output reaching time estimation part 300 calculates the target output reaching time Tc from when the fuel cell is brought into the Ready-on state to when it becomes capable of providing the maximum output and outputs the calculated target output reaching time Tc to cause the display apparatus 160 to display the time Tc and/or the audio output apparatus 165 to output the time Tc as an audio message to thereby notify the user (e.g., a driver) of the time Tc.

<Another Example of Estimation of Target Output Reaching Time>

As another example, a time from when the ignition key is turned on to when the fell cell reaches the Ready-on state may be estimated as the target output reaching time and the estimation result thereof may be notified of to the user. Although the processing in this case is the same as the above-mentioned processing and is not therefore separately shown in a drawing, the following is one example of how the processing may proceed.

Specifically, when the ignition key is turned on (IG ON), the target output reaching time estimation part 300 reads the outlet temperature of the fuel cell 40 at the time of start-up at a below-freezing temperature (the temperature of the water outlet of the fuel cell stack at the time of start-up) and the water content in the fuel cell 40 as of the last time the fuel cell system was stopped. Then, the target output reaching time estimation part 300 reads a map of necessary times (required times), inputs the above-mentioned information (i.e. the outlet temperature of the fuel cell at the time of start-up at a below-freezing temperature and the water content in the fuel cell as of the last time the fuel cell system was stopped), and obtains a result (target output reaching time Tb) from the correlation table.

Then, the target output reaching time estimation part 300 outputs a predetermined fuel cell output (a Ready-on output) and a target output reaching time Tb (a waiting time required for the temperature to reach the freezing point) that were obtained from the map so as to cause the display apparatus 160 to display the time and/or the audio output apparatus 165 to output the time as an audio message to thereby notify the user (e.g., a driver) of the target output reaching time. By notifying the user of the target output reaching time as described above, it is possible to reduce or eliminate the uncomfortableness that the user would feel when he/she has no idea of how long he/she has to wait until the fuel cell reaches the Ready-on state.

<Example of Output Transition Model During Start-Up Operation at Below-Freezing Temperature>

Figure 5:
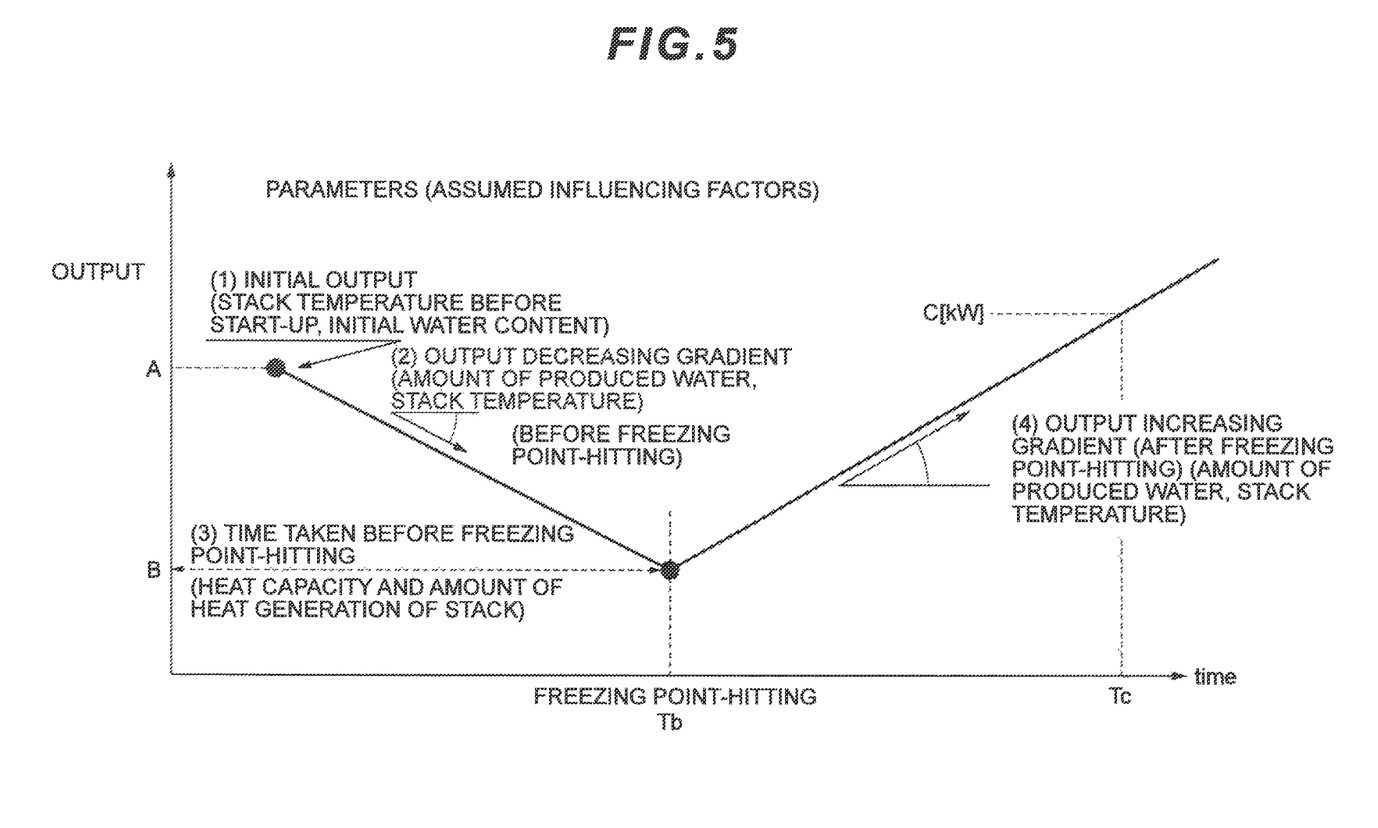
FIG. 5 is a diagram showing an example of a graph showing an output transition model during the start-up at a below-freezing temperature.

FIG. 5 shows an example of a graph showing an output transition model during start-up operation at a below-freezing temperature. Referring to FIG. 5, an output transition model during start-up at a below-freezing temperature will be described.

In this specification, a phenomenon in which the temperature of the fuel cell (e.g., the temperature of the water outlet of the fuel cell stack) reaches the freezing point refers to the "freezing point-hitting." The timing of the freezing point-hitting may be very close to the timing of the Ready-on state as in the present embodiment.

Parameters in the output transition model (subjects of estimation) include (1) an initial output of the fuel cell, (2) an output decreasing gradient (before the freezing point-hitting), (3) time taken before the freezing point-hitting and (4) an output increasing gradient (after the freezing point-hitting). Assumed influencing factors for the respective factors will be described below and indicated in the parentheses after the respective parameters in FIG. 5 (see FIG. 5).

(1) An initial output A of the fuel cell 40 after the ignition key was turned on is assumed to vary depending on the fuel cell temperature (e.g., a stack temperature) before start-up and initial water content in the fuel cell 40.

(2) The decreasing gradient of the output of the fuel cell observed before the freezing point-hitting (before the fuel cell temperature reaches the freezing point) is assumed to vary depending on the amount of produced water and the fuel cell temperature (e.g., the stack temperature). For example, when the fuel cell is started at a below-freezing temperature, the produced water is frozen in a gap between separators of the fuel cell, which causes a heat generation area to be reduced, and the output of the fuel cell decreases gradually due to this effect. The output of the fuel cell that becomes minimum at the timing close to the freezing point-hitting is indicated as B in the present embodiment.

(3) The time taken before the freezing point-hitting is assumed to vary depending on the heat capacity and the amount of heat generation of the fuel cell stack.

(4) The increasing gradient of the output of the fuel cell after the freezing point-hitting is assumed to vary depending on the amount of produced water and the fuel cell temperature (e.g., the stack temperature).

Regarding the assumed influencing factors for the respective parameters, the "amount of produced water," "fuel cell stack temperature" "heat capacity of the fuel cell stack" and "amount of heat generation of the fuel cell stack" are factors that are already known or that can be detected by sensors such as the temperature sensor 50 or that can be calculated in the control unit 80 based on various information. Accordingly, by relying on the fuel cell temperature (e.g., the stack temperature) before start-up at a below-freezing temperature and the initial water content at the time of start-up, it is possible to obtain a waiting time required the output of the fuel cell to reach a predetermined target output value (the target output reaching time) using the output transition model shown in FIG. 5. If, for example, an output at the timing of the fuel cell turning into the Ready-on state during the start-up at a below-freezing temperature is B (kW), an elapse time (the target output reaching time; in this case $t_1$) in a situation in which the value B (kW) is employed as a target output value can be obtained using the output transition model (see FIG. 5).

<Calculation Example in Output Transition Model During Start-Up at Below-Freezing Temperature>

Figure 6:
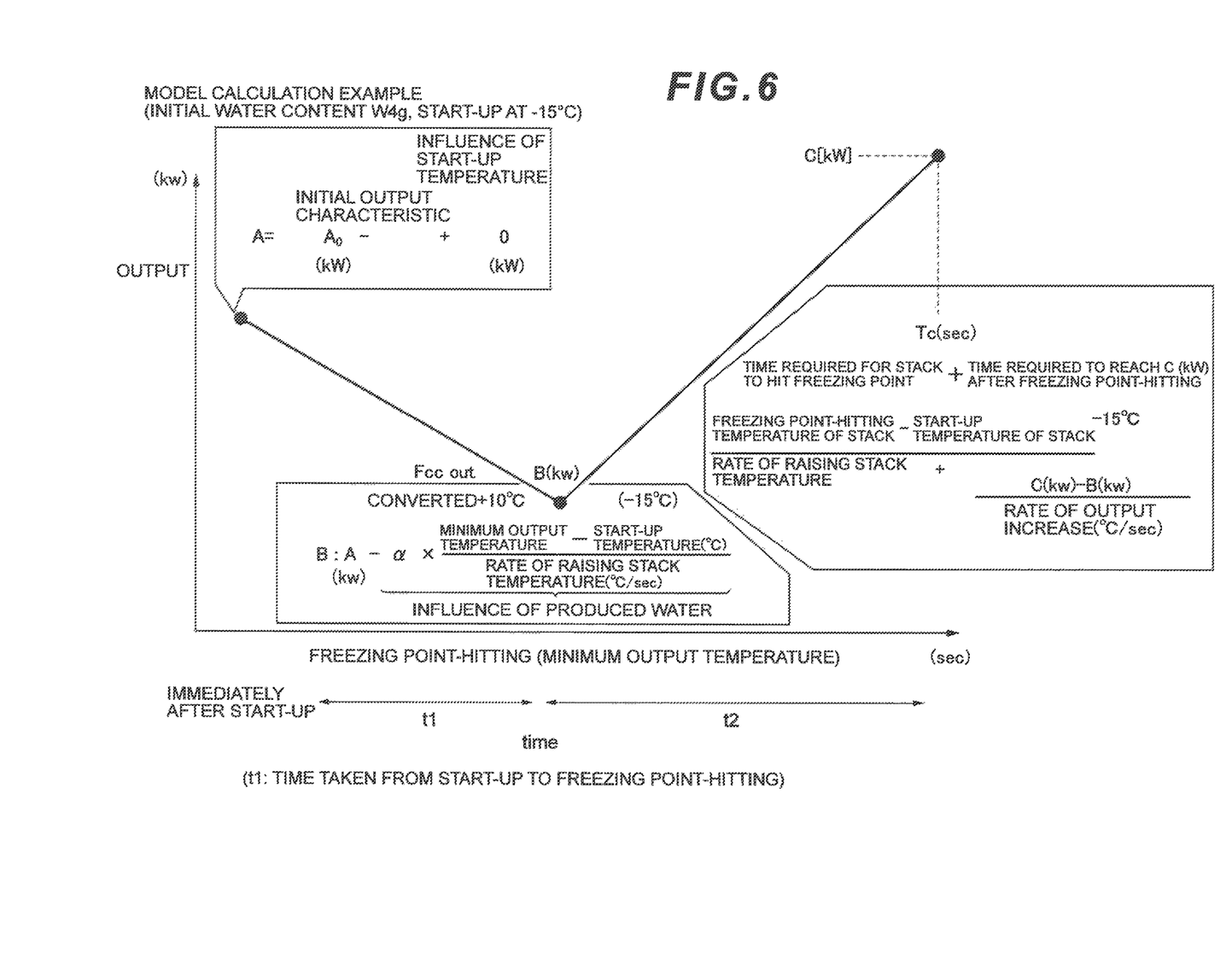
FIG. 6 is a diagram showing a calculation example in the output transition model during the start-up at a below-freezing temperature, along with the model.

FIG. 6 is a diagram showing a calculation example in the output transition model during the start-up at a below-freezing temperature along with the model. This example assumes a state in which the initial water content is about a middle level and the temperature at the time of start-up is −15° C. In FIG. 6, specific examples of numerical values are indicated with parentheses near general expressions or substituted into the general expressions. Reference symbol t1 in FIG. 6 denotes a target output reaching time taken from immediately after the start-up of the fuel cell system 1 to the freezing point-hitting and reference symbol t2 denotes a target output reaching time taken from the freezing point-hitting to the time when the fuel cell becomes capable of providing the expected output (e.g., C (kW).

<Example of Map>

FIG. 7 is a diagram showing an example of a map indicating results of study regarding the output transition model, etc. during the start-up at a below-freezing temperature. As described above, the target output reaching time is obtained by reading such map and using the correlation table in the present embodiment.

The map shown in FIG. 7 is configured such that it is possible to obtain, from the initial water content ($W_1g$, $W_2g$, $W_3g$, $W_4g$, $W_5g$, $W_6g$) at the time of start-up and the temperature at the time of start-up at a below-freezing point (−20° C., −15° C., −14° C., −13° C., −12° C., −11° C., −10° C.), the initial output A (kW) immediately after start-up, the minimum output B (kW) and time Tc that elapses before the output C (kW) is reached (i.e., the target output reaching time), respectively, in a correlated manner. Provided that the initial water content is the same (e.g., $W_1$), the higher the temperature at the time of start-up is, the higher the initial output A (kW) and the minimum output B (Kw) are (e.g., $A_{(w1,-20)} < A_{(W1,-5)} < \ldots < A_{(W1,-10)}$ and $B_{(w1,-20)} < B_{(W1,-15)} < \ldots B_{(W1,-10)}$), and the lower the output C is (e.g., when the initial water content is $W_5$, $C_{(w5,-20)} > C_{(W5,-15)} > \ldots > C_{(W5,-10)}$). The target output reaching time Tc field as of reaching the output C (kW) that shows a bar without any numerical value indicates that no time Tc lapses before the output C (kW) is reached, i.e., the output C (kW) can be provided immediately after the Ready-on state is reached.

It should be noted that the hatched fields in the map indicate conditions in which it is difficult to reach the Ready-on state immediately after start-up. In other words, it can be said that the use or start-up of the fuel cell 40 should be avoided in those conditions.

Needless to say, the numerical values indicated in the map of FIG. 7 are merely examples of suitable values and each numerical value may vary depending on factors such as the size and specification of the fuel cell 40 and the heat capacity of the fuel cell stack. Alternatively, a map in which the initial volume and the start-up temperature are classified into finer groups may be prepared or data corresponding to a numerical value approximate to a numerical value indicated in the map may be calculated using an interpolation or a least-squares method.

As described above, in the present embodiment, in the situation where it takes time (the target output reaching time) for the fuel cell system 1 started at a below-freezing temperature to reach the Ready-on timing in which the minimum necessary output can be obtained during the WOT, the user is notified of the target output reaching time (or the status that the target output has not yet been achieved) via a text message, an audio message and the like. With such configuration, since the user can understand such condition even if he/she cannot obtain a desired output by pressing the accelerator pedal during the start-up at a below-freezing temperature, it is possible to reduce their feeling strange due to the situation in which he/she cannot obtain the desired output.

Although the embodiment above is an example of preferred embodiments of the present disclosure, the embodiments should not be limited thereto and various modifications may be made without departing from the gist of the present disclosure. For example, although the outlet temperature of the fuel cell 40 (the FC outlet temperature at the time of start-up) is used in the present embodiment, the specific examples of the outlet temperature should not be particularly limited. In short, the fuel cell system 1 of the present disclosure is based on a model that estimates the amount of frozen water and the temperature-raising time using the fuel cell temperature at the time of start-up on the premise that the more the amount of frozen water in the fuel cell system 40 at the time of start-up at a below-freezing temperature is, the longer it takes to unfreeze it and the lower the fuel cell temperature at the time of start-up is, the longer it takes to raise the temperature. Thus, the specific position to measure the fuel cell temperature is not particularly limited as long as the present disclosure is based on a model that similarly estimates the amount of frozen water and the temperature-raising time at the time of start-up at a below-freezing temperature. Similarly, as long as the present disclosure is based on the model that estimates the amount of frozen water at the time of start-up at a below-freezing temperature, factors other than the water content in the fuel cell as of the last time the fuel cell system was stopped may also be employed.

Although the aspect of estimating the target output reaching time during the WOT has been described in the present embodiment, this is merely one example of an expected output desired or expected by the user. For example, if the position of the accelerator pedal as pressed by the user is 80% of the fully-pressed position, the expected output at that point in time is a fuel cell output that corresponds to the 80% position of the accelerator pedal, and the target output reaching time estimation part 300 estimates the target output reaching time required for the fuel cell 40 to become capable of providing the expected output or a predetermined output according to the expected output, in the same way as in the above-mentioned embodiment.

According to the present disclosure, it is possible to reduce or eliminate the frustration that a user may feel while waiting for the Ready-on state during start-up at a below-freezing temperature or a user feeling strange when a desired output cannot be obtained even by pressing an accelerator pedal.

The present disclosure is suitable for use in a fuel cell system that may be started at a below-freezing temperature.

What is claimed is:

1. A fuel cell system comprising:
    a fuel cell that generates electric power through an electrochemical reaction between a fuel gas and an oxidant gas;
    a water content acquisition unit configured to acquire a water content in the fuel cell as of a last time the fuel cell system was stopped;
    a temperature acquisition unit configured to acquire a temperature inside the fuel cell by detecting a temperature inside the fuel cell at a time of start-up of the fuel cell system;
    an estimation unit configured to estimate an amount of ice existing inside the fuel cell based on the acquired water content and temperature;
    a notification unit that notifies a user of a time required for the estimated amount of ice to be reduced to a predetermined value or less;
    a target output reaching time estimation unit configured to estimate a target output reaching time required for the fuel cell after start-up at a below-freezing temperature to become capable of providing an expected output desired or expected by a user of the fuel cell system or a predetermined output according to the expected output, based on the water content in the fuel cell and the temperature inside the fuel cell at the time of start-up at a below-freezing temperature; and
    a target output reaching time notification unit that notifies the user of the time estimated by the target output reaching time estimation unit.

2. The fuel cell system according to claim 1, wherein:
    the target output reaching time estimated by the target output reaching time estimation unit is a time required for the fuel cell to reach a Ready-on state where the fuel cell provides a Ready-on output for supplying a predetermined electric power, after an ignition is turned on.

3. The fuel cell system according to claim 2, comprising a map that associates a water content within the fuel cell and a temperature of the fuel cell at the time of start-up at a below-freezing temperature with the target output reaching time, wherein the target output reaching time is estimated using the map.

4. The fuel cell system according to claim 1, wherein the target output reaching time estimated by the target output reaching time estimation unit is a time taken from when the Ready-on state is reached where the fuel cell provides a Ready-on output for supplying a predetermined electric power when the fuel cell provides an output according to a position of an accelerator pedal as pressed by the user.

5. The fuel cell system according to claim 4, wherein the position of the accelerator pedal as pressed by the user is a fully-pressed position.

6. The fuel cell system according to claim 5, comprising a map that associates a water content within the fuel cell and a temperature of the fuel cell at the time of start-up at a below-freezing temperature with the target output reaching time, wherein the target output reaching time is estimated using the map.

7. The fuel cell system according to claim 4, comprising a map that associates a water content within the fuel cell and a temperature of the fuel cell at the time of start-up at a below-freezing temperature with the target output reaching time, wherein the target output reaching time is estimated using the map.

8. The fuel cell system according to claim 1, comprising a map that associates the water content within the fuel cell and the temperature of the fuel cell at the time of start-up at a below-freezing temperature with the target output reaching time, wherein the target output reaching time is estimated using the map.

9. A start-up method of starting, at a below-freezing temperature, a fuel cell system including a fuel cell that generates electric power through an electrochemical reaction between a fuel gas and an oxidant gas, the method comprising:
    estimating an amount of ice existing inside the fuel cell based on an acquired water content in the fuel cell as of a last time the fuel cell system was stopped and temperature inside the fuel cell at a time of start-up;
    estimating a target output reaching time that requires for the fuel cell after start-up at a below-freezing temperature to become capable of providing an expected output desired or expected by a user of the fuel cell system or a predetermined output according to the expected output, based on a water content in the fuel cell and a temperature inside the fuel cell at the time of start-up at a below-freezing temperature; and
    notifying the user of the estimated time.

* * * * *